US011394635B2

(12) United States Patent
Mahadevan et al.

(10) Patent No.: US 11,394,635 B2
(45) Date of Patent: Jul. 19, 2022

(54) AGGREGATED BIT INDEX EXPLICIT REPLICATION NETWORKING SYSTEM

(71) Applicant: Dell Products L.P., Round Rock, TX (US)

(72) Inventors: Ramasubramani Mahadevan, Chennai (IN); Senthil Nathan Muthukaruppan, Chennai (IN)

(73) Assignee: Dell Products L.P., Round Rock, TX (US)

(*) Notice: Subject to any disclaimer, the term of this patent is extended or adjusted under 35 U.S.C. 154(b) by 93 days.

(21) Appl. No.: 16/902,898

(22) Filed: Jun. 16, 2020

(65) Prior Publication Data

US 2021/0306251 A1 Sep. 30, 2021

(30) Foreign Application Priority Data

Mar. 28, 2020 (IN) .............................. 202011013693

(51) Int. Cl.
*H04L 45/16* (2022.01)
*H04L 45/24* (2022.01)
*H04L 49/201* (2022.01)
*H04L 61/5069* (2022.01)
*H04L 45/586* (2022.01)

(52) U.S. Cl.
CPC ............ *H04L 45/16* (2013.01); *H04L 45/245* (2013.01); *H04L 45/586* (2013.01); *H04L 49/201* (2013.01); *H04L 61/2069* (2013.01)

(58) Field of Classification Search
None
See application file for complete search history.

(56) References Cited

U.S. PATENT DOCUMENTS

| 2019/0097944 A1* | 3/2019 | Kotalwar | .............. H04L 47/806 |
| 2020/0412562 A1* | 12/2020 | Peng | .................. H04L 12/4675 |
| 2021/0152617 A1* | 5/2021 | Bidgoli | ................. H04L 49/201 |

* cited by examiner

*Primary Examiner* — Anh Ngoc M Nguyen
(74) *Attorney, Agent, or Firm* — Joseph Mencher

(57) ABSTRACT

An aggregated BIER networking system includes first and second aggregated BFER devices that are each directly connected to first and second receiver devices. The first aggregated BFER device receives a request from the first receiver device for multicast data packets generated by a source device and transmits the request to a BFIR device. The first aggregated BFER device also receives an identification from the second aggregated BFER device of the second receiver device that has requested multicast data packets generated by the source device. The first aggregated BFER device advertises a virtual BFER device that appears to be directly connected to each of the first and second aggregated BFER devices, and each of the first and second receiver devices. The first aggregated BFER device then receives a multicast data packet identifying the virtual BFER device, and forwards the multicast data packet to each of the first and second receiver devices.

20 Claims, 12 Drawing Sheets

AGGREGATED BIT INDEX EXPLICIT REPLICATION NETWORKING SYSTEM

CROSS-REFERENCE TO RELATED APPLICATIONS

This application claims priority to Indian Provisional Application No. 202011013693, filed Mar. 28, 2020, the disclosure of which is incorporated herein by reference in its entirety.

BACKGROUND

The present disclosure relates generally to information handling systems, and more particularly to aggregated networking information handling systems utilizing Bit Index Explicit Replication (BIER).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, router devices, switch devices, and/or other networking devices known in the art, utilize Bit Index Explicit Replication (BIER), which is a relatively new architecture provided for forwarding multicast data packets via a multicast domain without requiring a protocol for explicitly building multicast distribution trees, and without the need for intermediate nodes to maintain any per-flow state, which results in a considerable simplification in the forwarding of multicast data packets relative to existing multicast routing protocols. As will be appreciate by one of skill in the art, when a multicast data packet enters a BIER networking domain, the ingress router device receiving that multicast data packet determine a set of egress router devices to which the multicast data packet needs to be sent, and encapsulate that multicast data packet with a BIER header that includes a bit string in which each bit represents a respective egress router device in the BIER multicast domain to which the multicast data packet will be forwarded. However, in some situations, multiple BIER networking devices may be aggregated to operate as a single logical networking device having the physical capabilities of the multiple BIER networking devices, which can raise some issues.

For example, some networking devices utilize aggregation protocols such as the Virtual Link Trunking (VLT) protocol (a proprietary aggregation protocol provided in switch devices available from DELL® Inc. of Round Rock, Tex., United States) in order to provide a redundant, load-balancing connection to a core network in a loop-free environment while eliminating the need to utilize the Spanning Tree Protocol. However, when BIER networking devices are aggregated in a BIER networking domain, receiver devices subscribed to multicast communications provided by source devices may receive duplicate multicast data packets. To provide a specific example, a BIER networking device directly connected to the source device in a BIER networking domain is called a Bit Forwarding Ingress Router (BFIR) device. Furthermore, a BIER networking device that is not directly connected to a source device or receiver devices in a BIER networking domain is called a "transit" Bit Forwarding Router (BFR) device, and in this example a first transmit BFR device may be connected to the BFIR device and a second transit BFR device. Further still, a BIER networking device directly connected to receiver device(s) in a BIER networking domain is called Bit Forwarding Egress Router (BFER) device, and in this example a pair of BFER networking devices may be aggregated using the VLT protocol ("first and second VLT BFER devices" below), with each VLT BFER device directly connected to the second transit BFR device and a pair of receiver devices.

Multicast operations in a BIER networking domain like that in the example provided above may begin with the receiver devices requesting, via the first and second VLT BFER devices, that the BFIR device forward multicast data packets generated by the source device to the receiver devices. As will be appreciated by one of skill in the art in possession of the present disclosure, the first and second VLT BFER devices will share with each other when a directly connected receiver device has "subscribed" to the multicast data packets generated by the source device. Subsequently, in response to receiving a multicast data packet from the source device, the BFIR device will forward that multicast data packet to the first transit BFR device, and the first transit BFR device will forward that multicast data packet to the second transit BFR device. The second transit BFR device will then send respective copies of the multicast data packet to each of the first and second VLT BFER devices. Due to the sharing of the subscribed receiver devices between the VLT BFER devices (discussed above), each of the first and second VLT BFER devices will provide copies of the multicast data packet they received from the second transit BFR device to each of the pair of receiver devices, resulting in each of the pair of receiver devices receiving duplicate copies of the multicast data packet.

Accordingly, it would be desirable to provide an aggregated BIER networking system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an aggregated Bit Index Explicit Replication (BIER) networking engine that is configured to: receive, from a first receiver device that is directly connected to each of a first aggregated BFER device and a second aggregated BFER device, a request for multicast data packets generated by a source device and, in response, transmit the request; receive, from a second aggregated BFER device that is directly connected to each of the first aggregated BFER device and the second aggregated BFER device, an identification of a second receiver device that has requested multicast data packets generated by the source device; advertise a virtual Bit Forwarding Egress Router (BFER) device that appears to be directly connected to each of a first aggregated BFER device, the second aggregated BFER device, the first receiver device, and the second receiver device; receive a multicast data packet that identifies the virtual BFER device; and forward the multicast data packet to each of the first receiver device and the second receiver device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
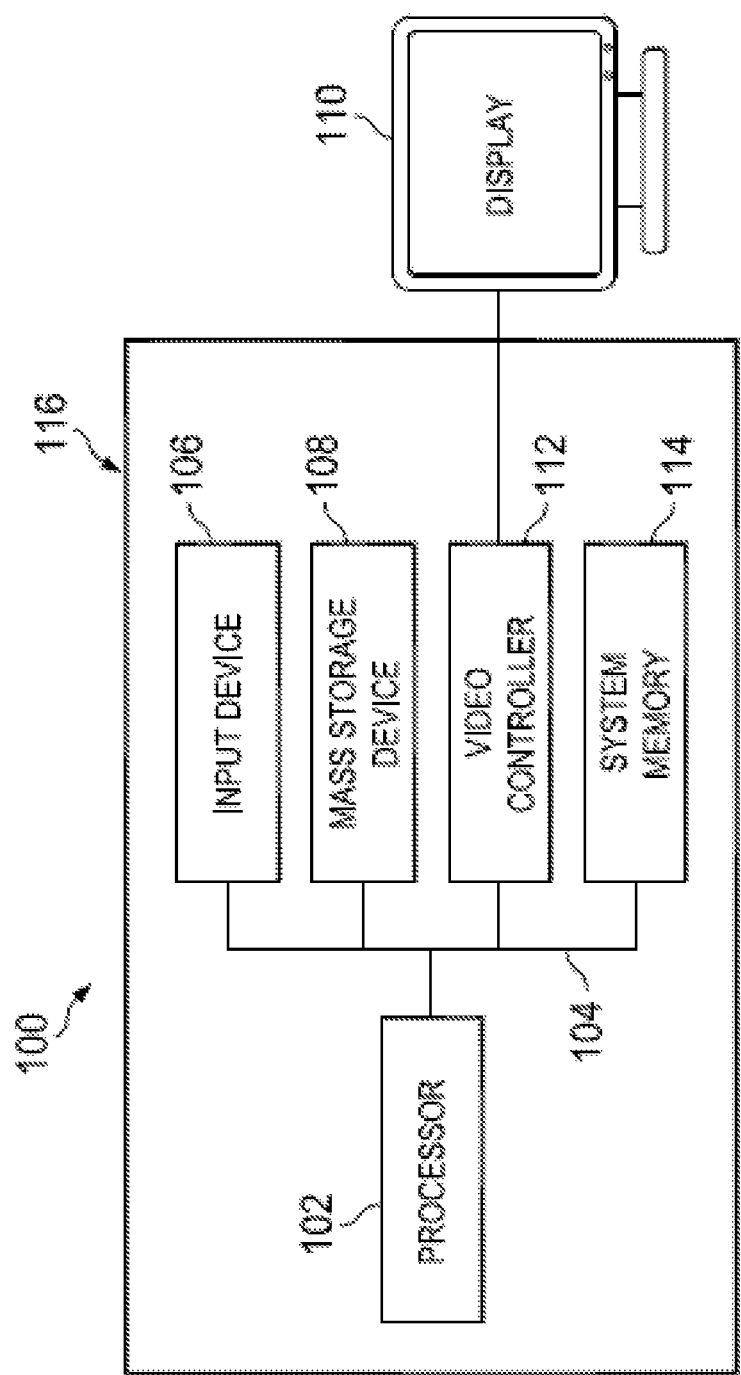
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
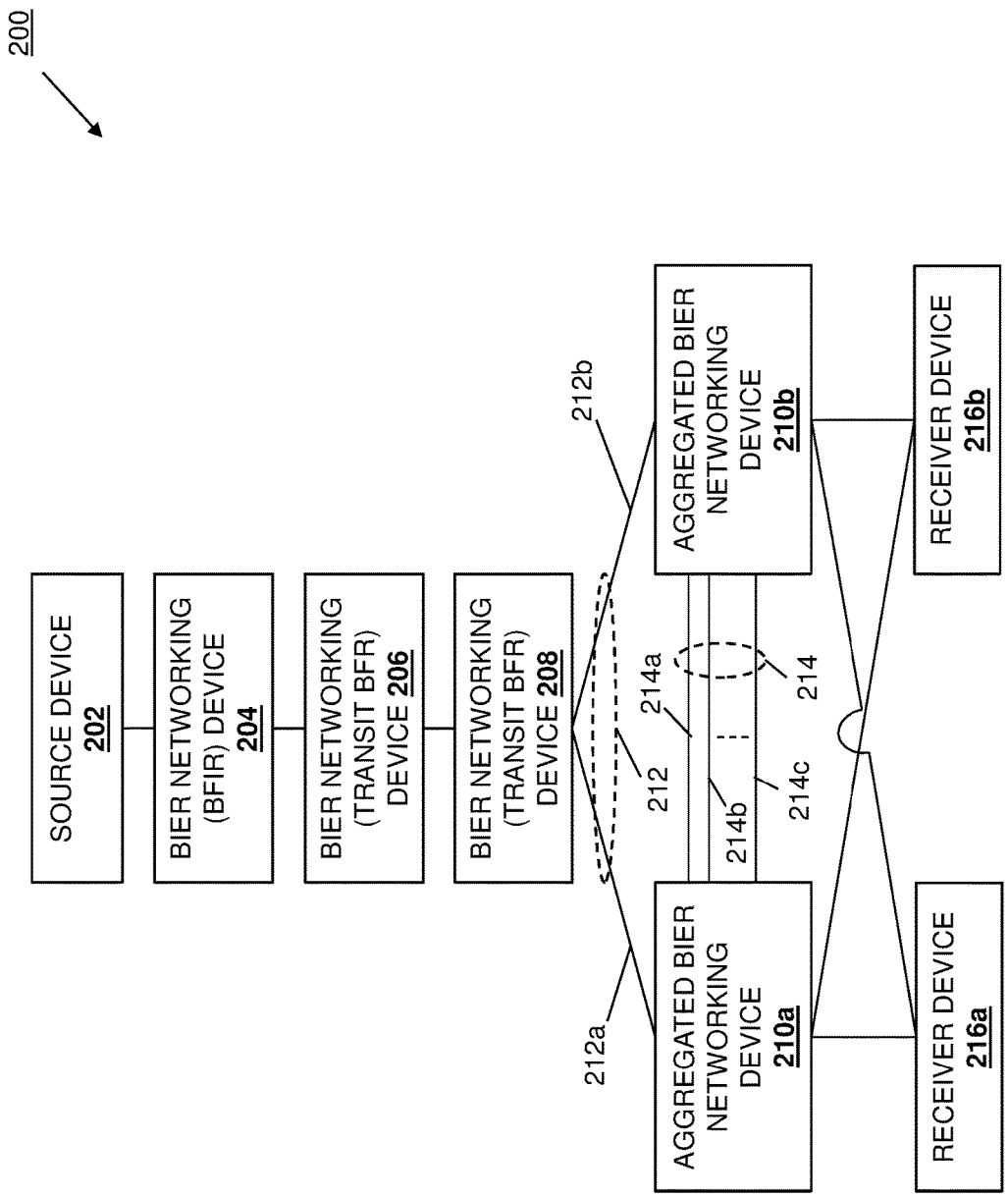
FIG. 2 is a schematic view illustrating an embodiment of an aggregated BIER networking system.

Referring now to FIG. 2, an embodiment of an aggregated Bit Index Explicit Replication (BIER) networking system 200 is illustrated. In the illustrated embodiment, the BIER networking system 200 incudes a source device 202. In an embodiment, the source device 202 may be provided by the IHS 100 discussed above with reference to FIG. 1, and/or may include some or all of the components of the IHS 100, and in specific examples may include server devices and/or any other computing device that is one of skill in the art in possession of the present disclosure will recognize as capable of generating multicast data packets like those discussed below. However, while illustrated and discussed as being provided by a server device, one of skill in the art in possession of the present disclosure will recognize that source devices provided in the BIER networking system 200 may include any devices that may be configured to operate similarly as the source device 202 discussed below.

In the illustrated embodiment, the BIER networking system 200 also includes a BIER networking device 204 that is coupled to the source device 202. In an embodiment, the BIER networking device 204 may be provided by the IHS 100 discussed above with reference to FIG. 1, and/or may include some or all of the components of the IHS 100. One of skill in the art in possession of the present disclosure will recognize that, in the specific examples described below, the BIER networking device 204 is configured as a Bit Forwarding Ingress Router (BFIR) device 204 due to, for example, its direct connection to a source device. However, while illustrated and discussed as being providing a BFIR device 204, one of skill in the art in possession of the present disclosure will recognize that BIER networking devices provided in the BIER networking system 200 may include any devices that may be configured to operate similarly as the BIER networking device 204 discussed below.

In the illustrated embodiment, the BIER networking system 200 also includes a BIER networking device 206 that is coupled to the BIER networking device 204, and a BIER networking device 208 that is coupled to the BIER networking device 206. In an embodiment, either or both of the BIER networking devices 206 and 208 may be provided by the IHS 100 discussed above with reference to FIG. 1, and/or may include some or all of the components of the IHS 100. One of skill in the art in possession of the present disclosure will recognize that, in the specific examples described below, the BIER networking devices 206 and 208 are configured as a "transit" Bit Forwarding Router (BFR) devices 206 and 208 due to, for example, their lack of a direct connection to a source device or a receiver device. However, while illustrated and discussed as providing transit BFR devices 206 and 208, one of skill in the art in possession of the present disclosure will recognize that BIER networking devices provided in the BIER networking system 200 may include any devices that may be configured to operate similarly as the BIER networking devices 206 and 208 discussed below.

In the illustrated embodiment, the BIER networking system 200 also includes aggregated BIER networking devices 210a and 210b that are coupled together, and that are each coupled to the BIER networking device 208. In an embodiment, either or both of the aggregated BIER networking devices 210a and 210b may be provided by the IHS 100 discussed above with reference to FIG. 1, and/or may include some or all of the components of the IHS 100, and in specific examples, may be aggregated using the Virtual Link Trunking (VLT) protocol, which one of skill in the art in possession of the present disclosure will recognize is a proprietary aggregation protocol provided in switch devices available from DELL® Inc. of Round Rock, Tex., United States, and that operates to provide a redundant, load-balancing connection to a core network in a loop-free environment while eliminating the need to utilize the Spanning Tree Protocol.

In the illustrated embodiment, the aggregated BIER networking devices 210a and 210b are coupled to the BIER networking device 208 via a Link Aggregation Group (LAG) 212 that includes a link 212a between the aggregated BIER networking device 210a and the BIER networking device 208, and a link 212b between the aggregated BIER networking device 210b and the BIER networking device 208. Furthermore, the aggregated BIER networking devices 210a and 210b are coupled together by an Inter-Chassis Link (ICL) 214 that includes a plurality of links 214, 214b, and up to 214c provided between the aggregated BIER networking devices 210a and 210b (e.g., via Ethernet cables connected to ports on each of the aggregated BIER networking devices 210a and 210b.) Continuing with the example in which the aggregated networking devices 210a and 210b are provided by VLT switch devices, the VLT switch devices 210a and 210b are coupled to the BIER networking/transit BFR device 208 by a VLT port channel 212, and coupled to each other by a VLT interconnect (VLTi) 214. One of skill in the art in possession of the present disclosure will recognize that, in the specific examples described below, the aggregated BIER networking devices 210a and 210b are conventionally configured as Bit Forwarding Egress Router (BFER) devices 210a and 210b due to, for example, their direct connection to receiver devices. However, while illustrated and discussed as being configured as BFER devices 210a and 210b, one of skill in the art in possession of the present disclosure will recognize that BIER networking devices provided in the BIER networking system 200 may include any devices that may be configured to operate similarly as the aggregated BIER networking devices 210a and 210b discussed below. Furthermore, one of skill in the art in possession of the present disclosure will recognize that the BIER networking devices 204, 206, 208, 210a, and 210b in FIG. 2 provide a BIER networking domain.

In the illustrated embodiment, the BIER networking system 200 also includes a receiver device 216a that is coupled to each of the aggregated BIER networking devices 210a and 210b, and a receiver device 216b that is coupled to each of the aggregated BIER networking devices 210a and 210b. In an embodiment, either or both of the receiver devices 216a and 216b may be provided by the IHS 100 discussed above with reference to FIG. 1, and/or may include some or all of the components of the IHS 100, and in specific examples may include server devices and/or any other computing device that is one of skill in the art in possession of the present disclosure will recognize as capable of subscribing to and receiving multicast data packets like those discussed below. However, while illustrated and discussed as being provided by server devices, one of skill in the art in possession of the present disclosure will recognize that receiver devices provided in the BIER networking system 200 may include any devices that may be configured to operate similarly as the receiver devices 216a and 216b discussed below. While a specific BIER networking system 200 has been illustrated and described, one of skill in the art in possession of the present disclosure will recognize that the BIER networking system of the present disclosure may include a variety of components and component configurations while remaining within the scope of the present disclosure as well.

Figure 3:
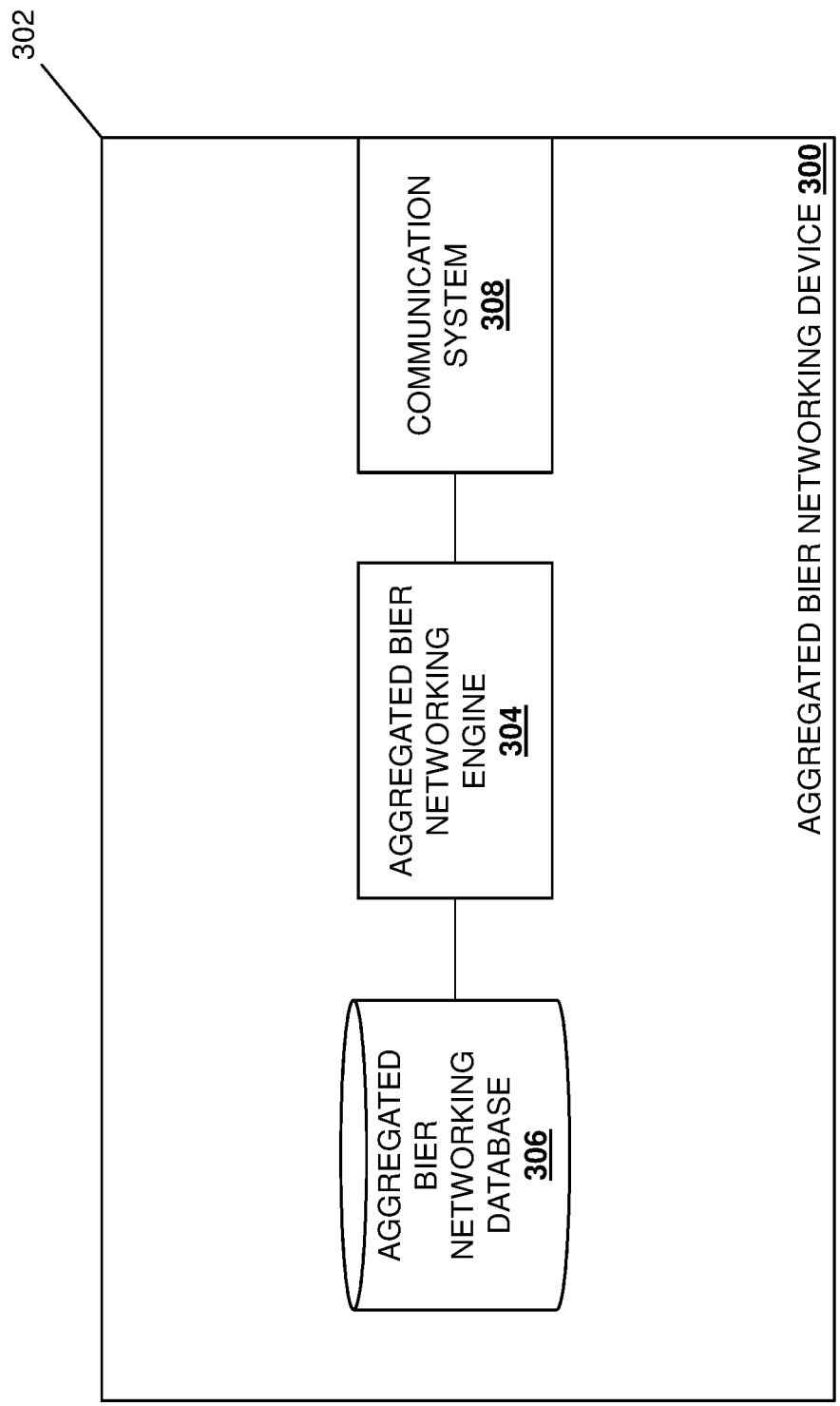
FIG. 3 is a schematic view illustrating an embodiment of an aggregate BIER networking device.

Referring now to FIG. 3, an embodiment of an aggregated BIER networking device 300 is illustrated that may provide either or both of the aggregated BEIR networking devices 210a and 210b discussed above with reference to FIG. 2. As such, the aggregated BIER networking device 300 may be provided by the IHS 100 discussed above with reference to FIG. 1 and/or may include some or all of the components of the IHS 100, and in specific examples may be provided by a VLT switch device that is configured as a BFER device (e.g., by being directly connected to a receiver device.) Furthermore, while illustrated and discussed as a VLT-enabled BIER networking device 300 in a BFER device configuration, one of skill in the art in possession of the present disclosure will recognize that the functionality of the aggregated BIER networking device 300 discussed below may be provided by other devices that are configured to operate similarly as the aggregated BIER networking device discussed below. In the illustrated embodiment, the aggregated BIER networking device 300 includes a chassis 302 that houses the components of the aggregated BIER networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an aggregated BIER networking engine 304 that is configured to perform the functionality of the aggregated BIER networking engines and/or aggregated BIER networking devices discussed below.

The chassis 302 may also house a storage system (not illustrated, but which may include the storage 108 discussed above with reference to FIG. 1) that is coupled to the aggregated BIER networking engine 304 (e.g., via a coupling between the storage system and the processing system) and that includes an aggregated BIER networking database 306 that is configured to store any of the information utilized by the aggregated BIER networking engine 304 (e.g., the data plane forwarding tables and control plane routing tables discussed below.) The chassis 302 may also house a communication system 308 that is coupled to the aggregated BIER networking engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 308 may include the ports and/or other subsystems for providing the links to the BIER networking devices and receiver devices discussed below. While a specific aggregated BIER networking device 300 has been illustrated, one of skill in the art in possession of the present disclosure will recognize that aggregated BIER networking devices (or other devices operating according to the teachings of the present disclosure in a manner similar to that described below for the aggregated BIER networking device 300) may include a variety of components and/or component configurations for providing conventional aggregated BIER networking device functionality, as well as the functionality discussed below, while remaining within the scope of the present disclosure as well.

Figure 4:
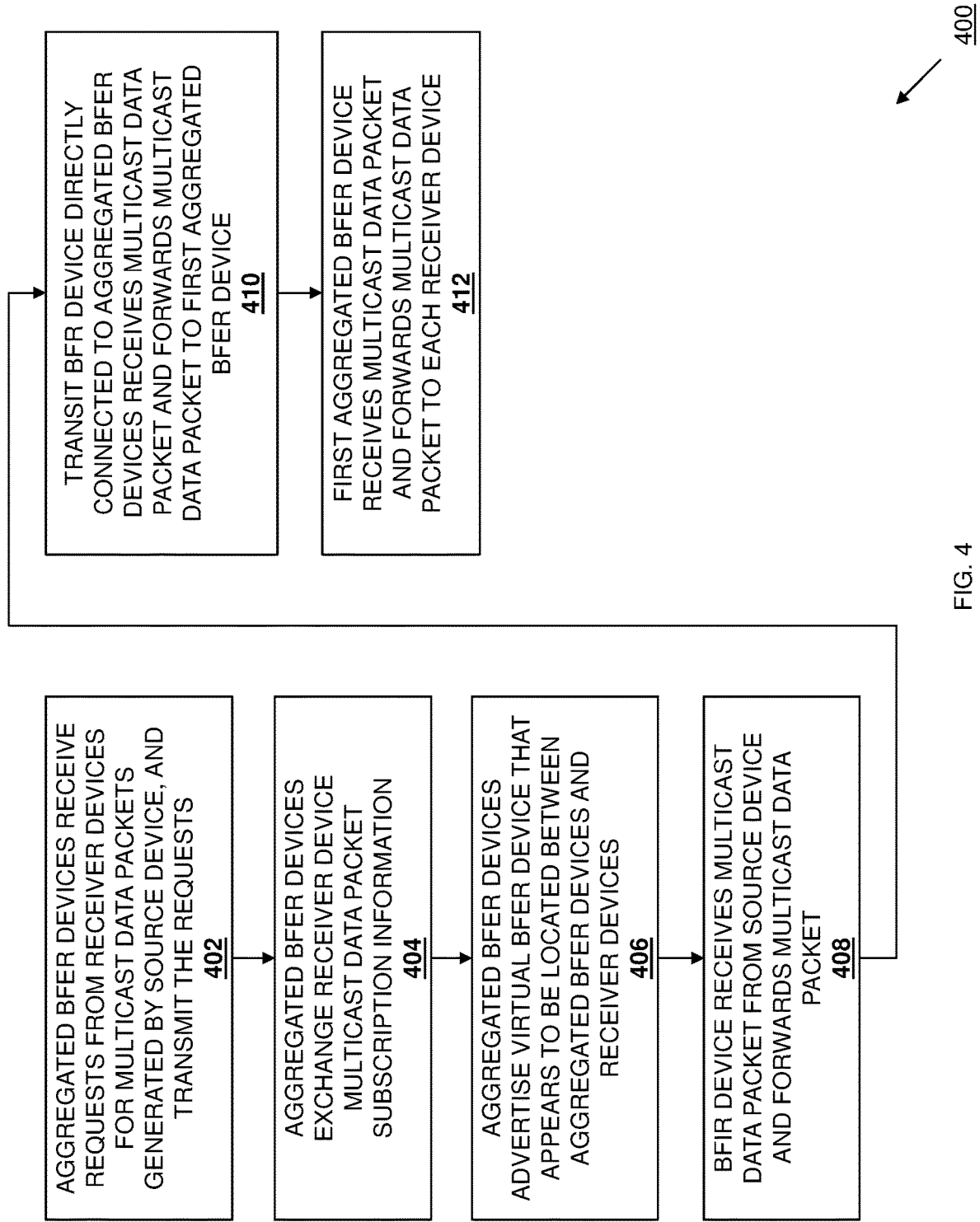
FIG. 4 is a flow chart illustrating an embodiment of a method for providing for forwarding of multicast data packets in an aggregated BIER networking system.

Referring now to FIG. 4, an embodiment of a method 400 for providing for forwarding of multicast data packets in an aggregated BIER networking system is illustrated. As discussed below, the systems and methods of the present disclosure provide aggregated BIER networking devices that are configured as BFER devices that are directly connected to receiver devices, but that operate as transit BFR devices while providing a virtual BFER device that appears to be directly connected to each of the aggregated BIER networking devices and each of the receiver devices. As such, a BIER networking device that is configured as a transit BFR device that is directly connected to the aggregated BIER networking devices will provide multicast data packets generated by a source device to only one of the aggregated BIER networking devices, which will then provide copies of those multicast data packets to each of the receiver devices, thus preventing the transmission of duplicate multicast data packets to the receiver devices that occurs in conventional aggregated BIER networking systems.

Conventional aggregated BIER networking system operations will now be briefly described in order to contrast those operations with the functionality provided by the systems and methods of the present disclosure. As will be appreciated by one of skill in the art in possession of the present disclosure, BIER networking systems may be conventionally configured with each of the BFIR device and the BFER devices being provided a respective unique identifier (a unique, 16-bit BFR-ID as per the Request For Comments (RFC) 8279 associated with the BIER architecture) that uniquely identifies the BFIR device and BFER devices, and each of the BFIR device, BFER devices, and transit BFR devices being provided a prefix (a BFR prefix) that describes the path that may be utilized to reach that BFIR device, BFER device, and transit BFR device. Furthermore, one of skill in the art in possession of the present disclosure will appreciate that BIER networking system configuration may include each of the BIER networking devices in the BIER networking domain generating data plane forwarding tables (Bit Index Forwarding Tables (BIFTs)) and control plane routing tables (Bit Index Routing Tables (BIRTs)) that may map BFR-IDs identifying BFER devices to a BFR prefix and BFR neighbor, the provisioning of BIER networking subdomains in the BIER networking domain, and/or other BIER networking system configuration operations known in the art.

Figure 5A:
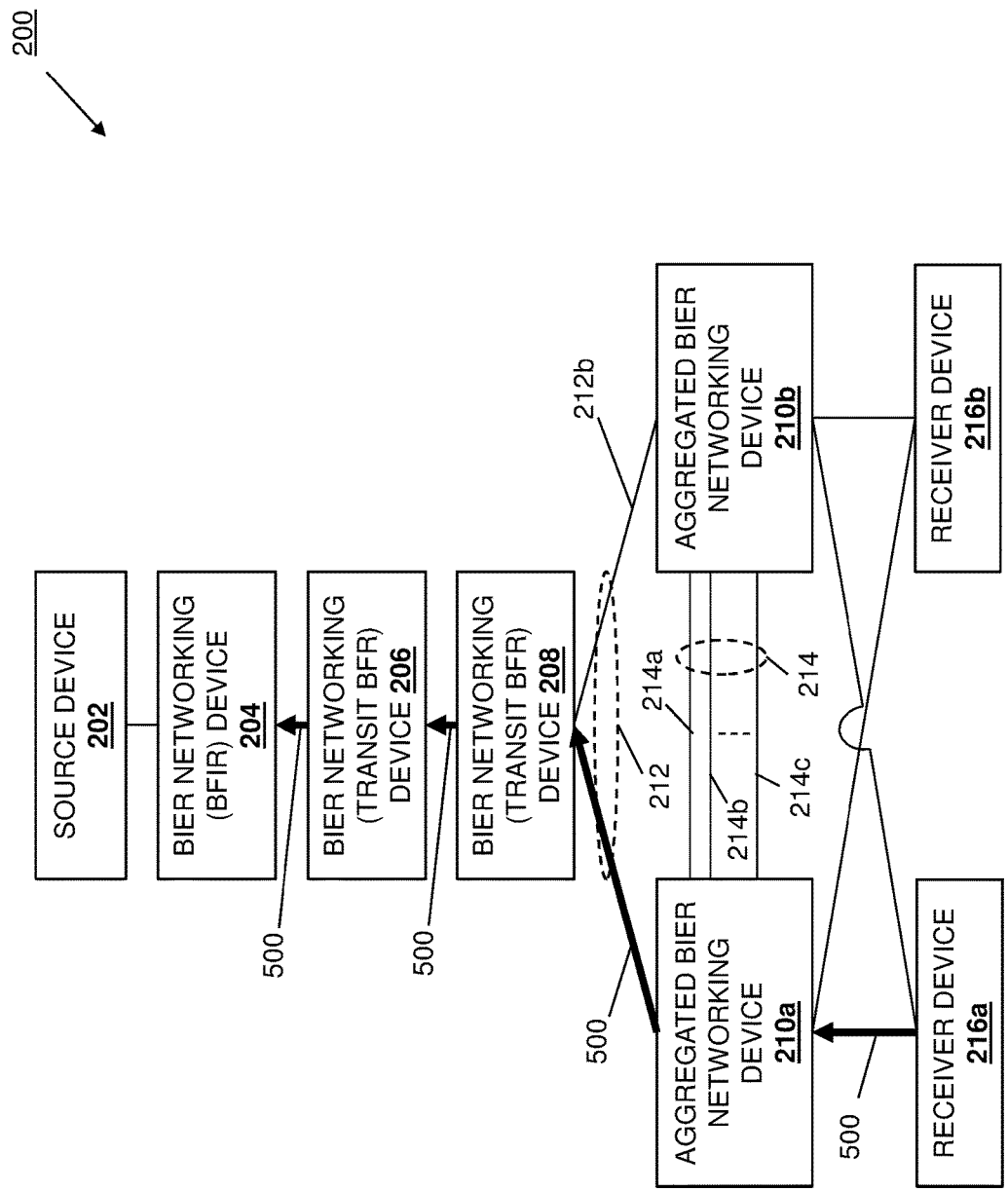
FIG. 5A is a schematic view illustrating an embodiment of the aggregated BIER networking system of FIG. 2 performing conventional BIER networking operations.
Figure 5B:
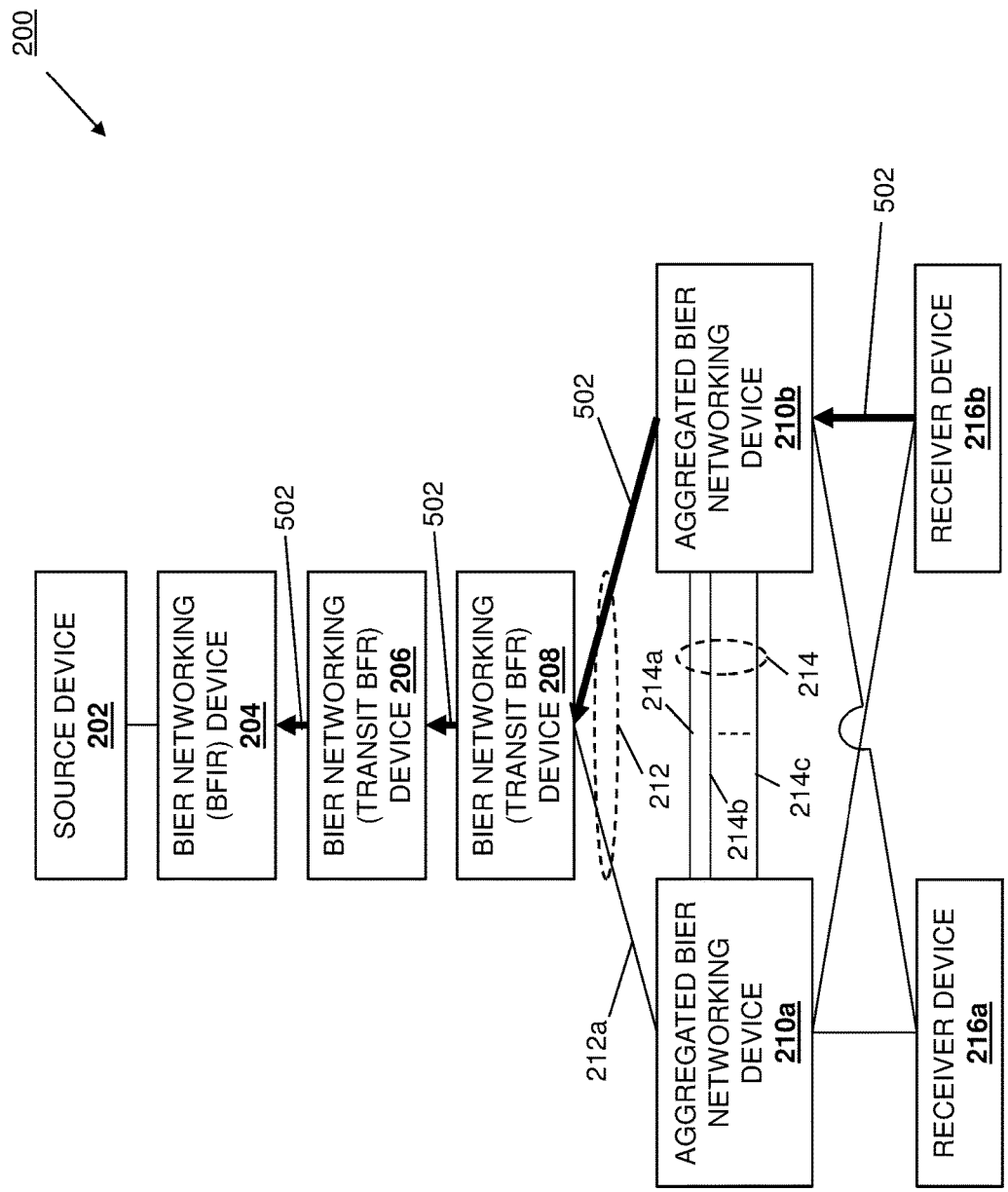
FIG. 5B is a schematic view illustrating an embodiment of the aggregated BIER networking system of FIG. 2 performing conventional BIER networking operations.
Figure 5C:
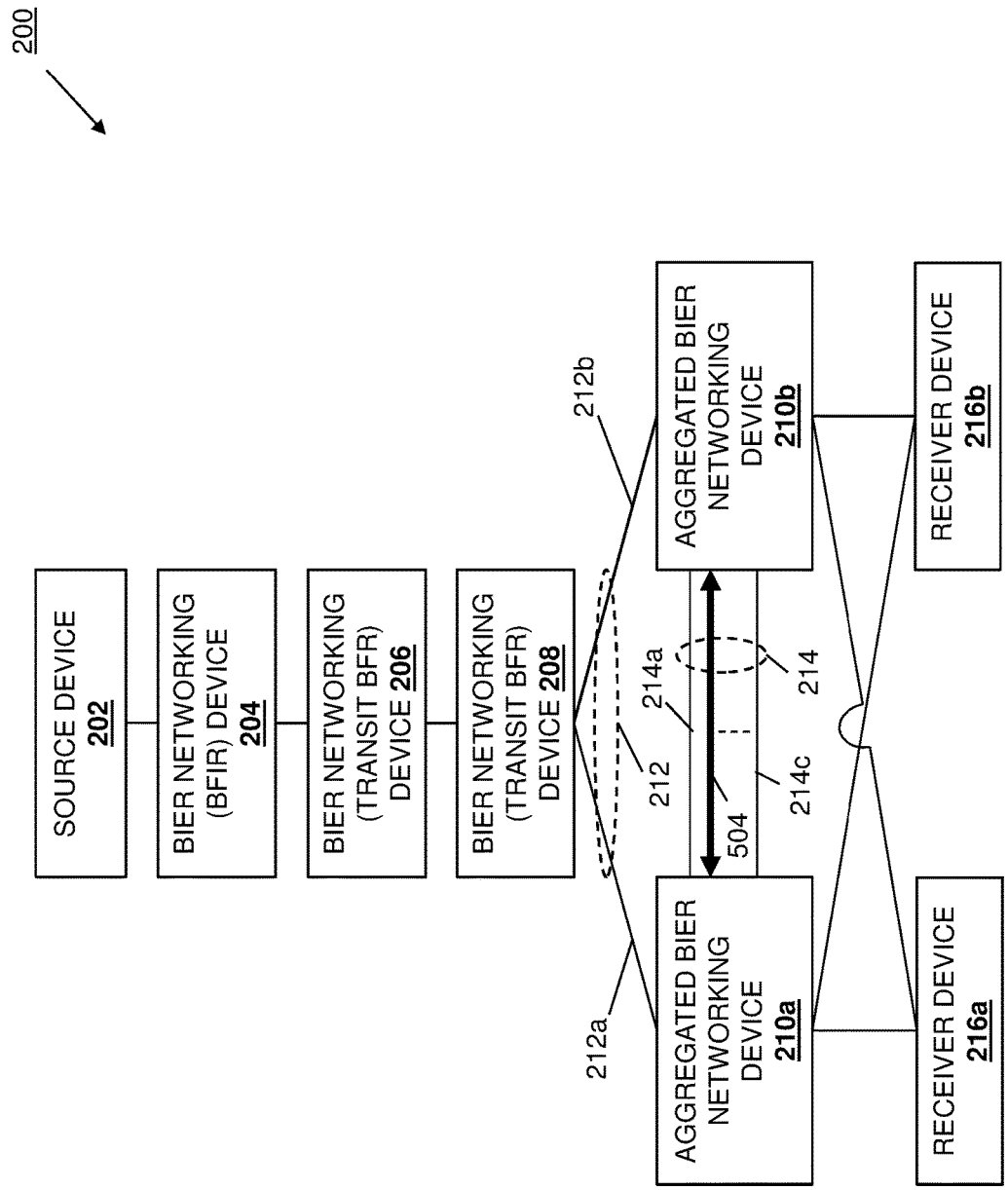
FIG. 5C is a schematic view illustrating an embodiment of the aggregated BIER networking system of FIG. 2 performing conventional BIER networking operations.

For example, with reference to the conventional aggregated BIER networking system operations illustrated and described with respect to FIGS. 5A-5E, FIG. 5A illustrates how the receiver device 216a may generate and transmit a multicast communications request 500 to subscribe to multicast data packets generated by the source device 202, which in the illustrated example is received by the aggregated BIER networking device 210a and forwarded (e.g., via an overlay control plane mechanism, Software Defined Networking (SDN) techniques, etc.) to the transit BFR device 208. The transit BFR device 208 may then forward the multicast communications request 500 to the transit BFR device 206, and the transit BFR device 206 may forward the multicast communications request 500 to the BFIR device 204. Similarly, FIG. 5B illustrates how the receiver device 216b may generate and transmit a multicast communications request 502 to subscribe to multicast data packets generated by the source device 202, which in the illustrated example is received by the aggregated BIER networking device 210b and forwarded (e.g., via an overlay control plane mechanism, Software Defined Networking (SDN) techniques, etc.) to the transit BFR device 208. The transit BFR device 208 may then forward the multicast communications request 502 to the transit BFR device 206, and the transit BFR device 206 may forward the multicast communications request 502 to the BFIR device 204. As discussed above and as illustrated in FIG. 5C, conventional aggregated networking device operations (e.g., VLT protocol operations) will result in the aggregated BIER networking devices 210a and 210b exchanging multicast communication receiver device subscriber information 504 in order to, for example, provide resilient multicast data packet forwarding. As such, in the example provided above, the aggregated BIER networking device 210a will inform the aggregated BIER networking device 210b that the receiver device 216a has subscribed to multicast communications from the source device 202, and the aggregated BIER networking device 210b will inform the aggregated BIER networking device 210a that the receiver device 216b has subscribed to multicast communications from the source device 202.

As will be appreciated by one of skill in the art in possession of the present disclosure, the BIER networking system configuration operations discussed above may include the generation of the following BIFT for the transit BFR device 206 based on the multicast communications requests 500 and 502:

| BFR ID | FORWARDING BIT MASK | BFR NEIGHBOR |
|---|---|---|
| 1 (0001) | 0001 | BFIR DEVICE 204 |
| 2 (0010) | 0110 | TRANSIT BFR DEVICE 208 |
| 4 (0100) | 0110 | TRANSIT BFR DEVICE 208 |

Similarly, the BIER networking system configuration operations discussed above may include the generation of the following BIFT for the transit BFR device 208 based on the multicast communications requests 500 and 502:

| BFR ID | FORWARDING BIT MASK | BFR NEIGHBOR |
|---|---|---|
| 1 (0001) | 0001 | TRANSIT BFR DEVICE 206 |
| 2 (0010) | 0010 | AGGREGATED BIER NETWORKING DEVICE 210a |
| 4 (0100) | 0100 | AGGREGATED BIER NETWORKING DEVICE 210a |

As will be appreciated by one of skill in the art in possession of the present disclosure, in the example of the BIFTs for the transit BFR devices 206 and 208 provided above, the BFIR device 204 has been provided a BFR-ID of "1" (i.e., a bit string "0001"), the aggregated BIER networking device 210a (which is configured as a BFER device as discussed above) has been provided a BFR-ID of "2" (i.e., a bit string "0010"), and the aggregated BIER networking device 210b (which is configured as a BFER device as discussed above) has been provided a BFR-ID of 4 (i.e., a bit string "0100"). While not explicitly illustrated or described above, one of skill in the art in possession of the present disclosure will appreciate that the BFIR device 204 may be provided a BIFT as well. Furthermore, as discussed above, each of the BFIR device 204, the transit BFR devices 206 and 208, and the aggregated BIER networking devices 210a and 210b may be provided a respective BFR prefix as well.

Figure 5D:
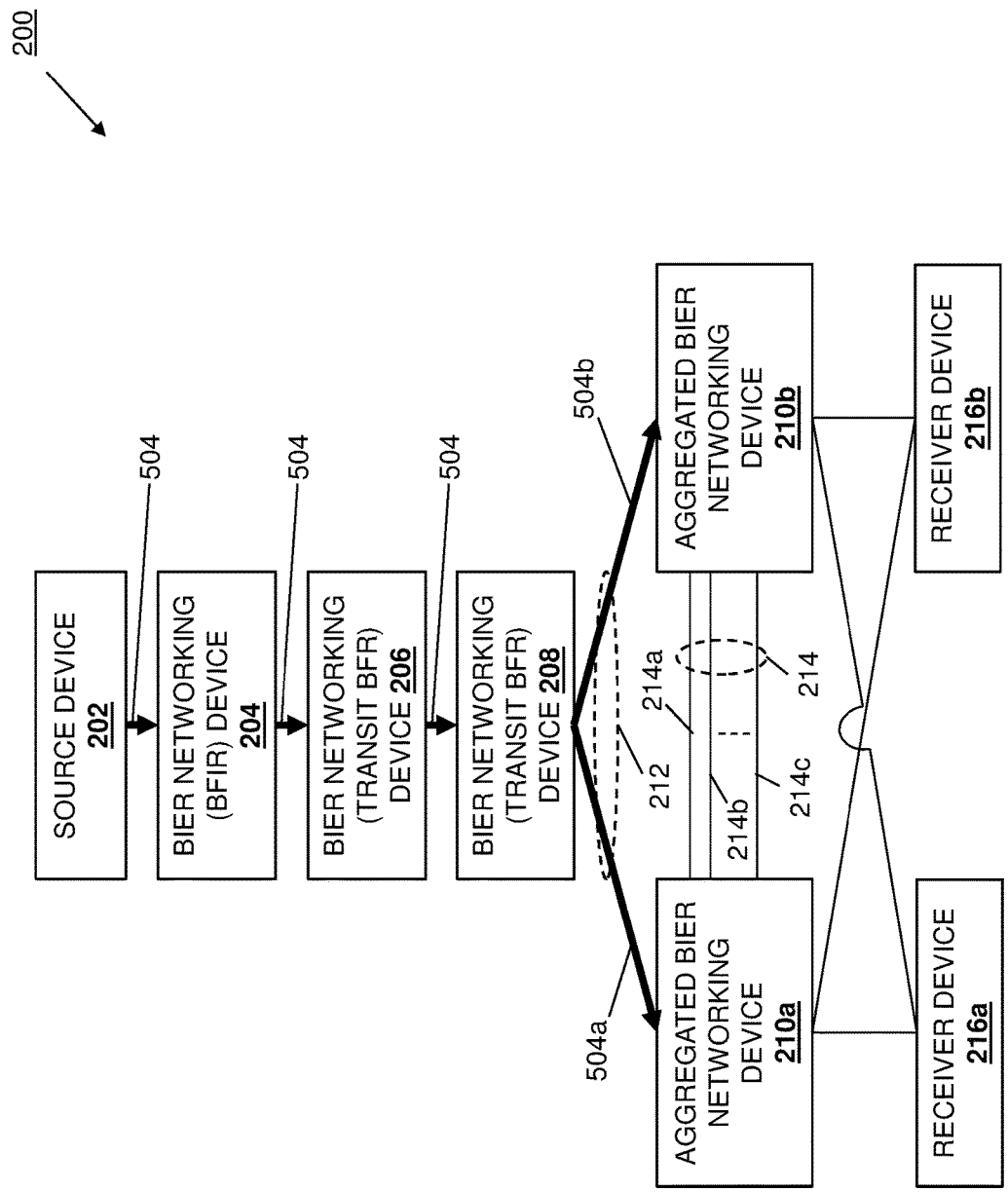
FIG. 5D is a schematic view illustrating an embodiment of the aggregated BIER networking system of FIG. 2 performing conventional BIER networking operations.

FIG. 5D illustrates how, subsequent to the BIER networking system configuration and multicast communication subscription discussed above, the source device 202 may generate and transmit a multicast data packet 504, which may be received by the BFIR device 204. In response to receiving the multicast data packet 504, the BFIR device 204 may utilize its BIFT to forward the multicast data packet 504 to the transit BFR device 206 with a bit string of "0110". In response to receiving the multicast data packet 504, the transit BFR device 206 may utilize its BIFT (above) to forward the multicast data packet 504 to the transit BFR device 208 (i.e., based on the bit string "0110" in the forwarding bit mask of its BIFT.) In response to receiving the multicast data packet 504, the transit BFR device 208 may utilize its BIFT (above) to create two copies 504a and 504b of the multicast data packet 504, forward the first copy 504a of the multicast data packet 504 to the aggregated BIER networking device 210a with a bit string of "0010", and forward the second copy 504b of the multicast data packet 504 to the aggregated BIER networking device 210b with a bit string of "0100".

Figure 5E:
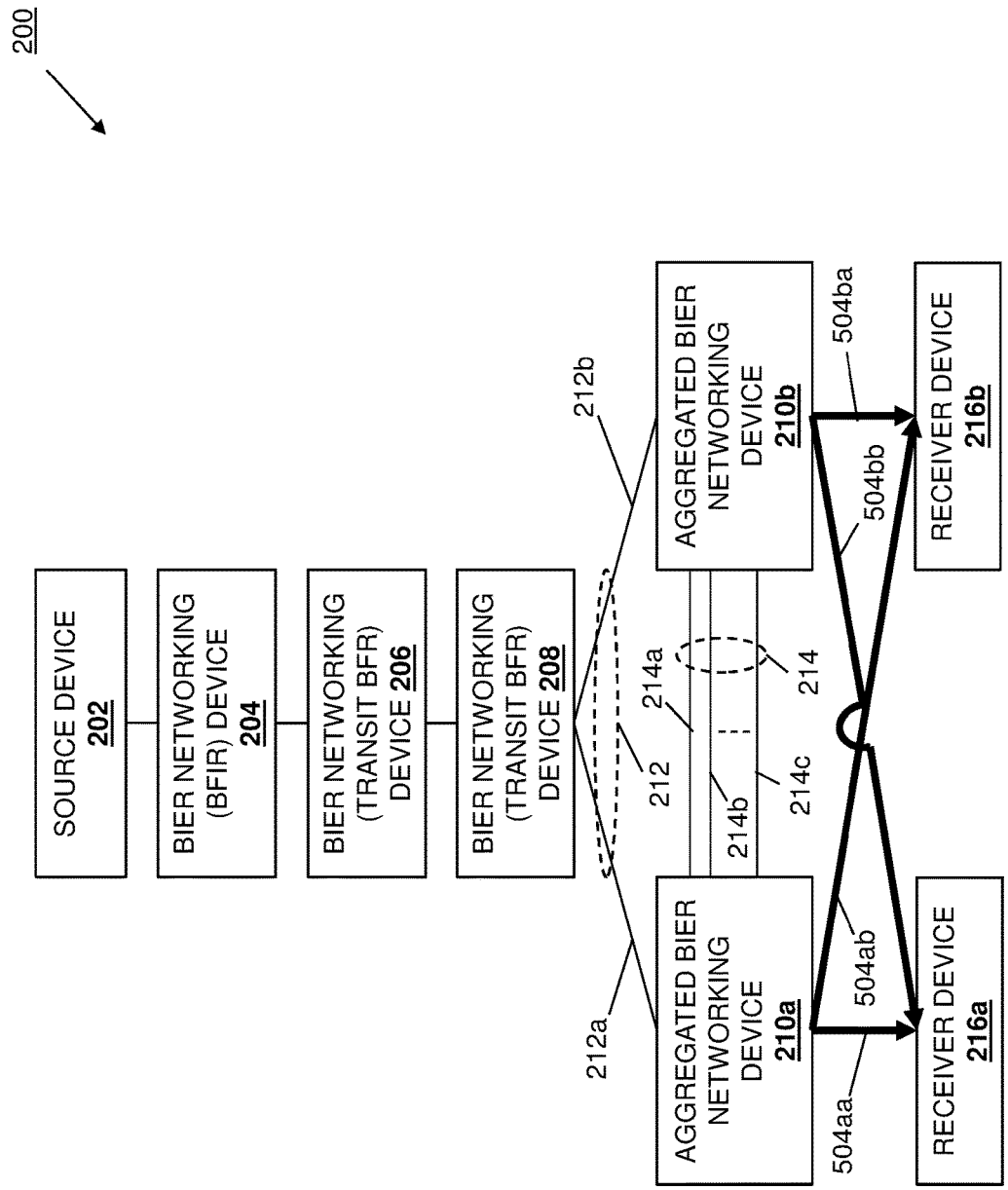
FIG. 5E is a schematic view illustrating an embodiment of the aggregated BIER networking system of FIG. 2 performing conventional BIER networking operations.

FIG. 5E illustrates how, in response to receiving the first copy 504a of the multicast data packet 504, the aggregated BIER networking device 210a may perform conventional aggregated networking device operations (e.g., VLT protocol operations) to create two copies 504aa and 504ab of the multicast data packet 504a, forward the third copy 504aa of the multicast data packet 504 to the receiver device 216a, and forward the fourth copy 504ab of the multicast data packet 504 to the receiver device 216b (i.e., as a result of its exchange of the multicast communication receiver device subscriber information with the aggregated BIER networking device 210b that indicates both receivers devices 216a and 216b have subscribed to the multicast data packets from the source device 202.) Similarly, FIG. 5E also illustrates how, in response to receiving the second copy 504b of the multicast data packet 504, the aggregated BIER networking device 210b may utilize its BIFT to create two copies 504ba and 504bb of the multicast data packet 504b, forward the fifth copy 504ba of the multicast data packet 504 to the receiver device 216b, and forward the sixth copy 504bb of the multicast data packet 504 to the receiver device 216a (i.e., as a result of its exchange of the multicast communication receiver device subscriber information with the aggregated BIER networking device 210a that indicates both receivers devices 216a and 216b have subscribed to the multicast data packets from the source device 202.)

As such, one of skill in the art in possession of the present disclosure will appreciate that conventional aggregated BIER networking system operations may result in each of the receiver devices 216a and 216b receiving multiple copies of the multicast data packet 504 (e.g., the receiver device 216a receives the third copy 504aa and the sixth copy 504bb of the same multicast data packet 504, and the receiver device 216b receives the fourth copy 504ab and the fifth copy 50b4ba of the same multicast data packet 504.) One theoretical solution to avoid such duplication of packets at the receiver devices 216a and 216b includes having each of the aggregated BIER networking devices 210a and 210b utilize the same BFR-ID. However, such a solution can lead to a conflict that may result in the BFIR device 204 not forwarding multicast data packets generated by the source device 202 to the receiver devices 216a and 216b (e.g., because the RFC 8279 associated with the BIER architecture requires that each node in the BIER networking domain utilize a unique BFR-ID, with duplicated BFR-IDs being ignored). However, as will be appreciated by one of skill in the art in possession of the present disclosure, the systems and methods described below provide for optimal resilient forwarding of multicast data packets in an aggregated BIER networking system (e.g., a BIER networking domain including VLT-enabled BFER devices) that eliminates the multicast data packet duplication at receiver devices discussed above, and that may be provided in a manner that is compatible with any routing protocol deployed as the underlay for the BIER networking domain (e.g., the Open Shortest Path First (OSPF) protocol, the Intermediate System to Intermediate System (IS-IS) protocol, the Border Gateway Protocol (BGP), etc.)

Referring to FIG. 4, the method 400 begins at block 402 where aggregated BFER devices receive requests from receiver devices for multicast data packets generated by a source device, and transmit the requests. In an embodiment, at block 404, the aggregated BIER networking engine 304 in the aggregated BIER networking device 210a/300 may receive a multicast communications request from the receiver device 216a and may transmit that multicast communications request to the BFIR device 204 via the transit BFR devices 206 and 208, similarly as described above for the multicast communications request 500 discussed with reference to FIG. 5A. Similarly, at block 404, the aggregated BIER networking engine 304 in the aggregated BIER networking device 210b/300 may receive a multicast communications request from the receiver device 216b and may transmit that multicast communications request to the BFIR device 204 via the transit BFR devices 206 and 208, similarly as described above for the multicast communications request 502 discussed with reference to FIG. 5B.

The method 400 then proceeds to block 406 where the aggregated BFER devices exchange receiver device multicast data packet subscription information. In an embodiment, at block 406, the aggregated BIER networking engines 304 in the aggregated BIER networking devices 210*a*/300 and 210*b*/300 may exchange multicast communication receiver device subscriber information in order to, for example, provide resilient multicast data packet forwarding, similarly as described above for the exchange of the multicast communication receiver device subscriber information 504 discussed with reference to FIG. 5C. As such, the aggregated BIER networking engine 304 in the aggregated BIER networking device 210*a* will inform the aggregated BIER networking engine 304 in the aggregated BIER networking device 210*b* that the receiver device 216*a* has subscribed to multicast communications from the source device 202, and the aggregated BIER networking engine 304 in the aggregated BIER networking device 210*b* will inform the aggregated BIER networking engine 304 in the aggregated BIER networking device 210*a* that the receiver device 216*b* has subscribed to multicast communications from the source device 202.

In an embodiment, during or prior to the method 400, the BIER networking domain provided by the BFIR device 204, the transit BFR devices 206 and 208, and the aggregated BIER networking devices 210*a* and 210*b* may be configured according to the teachings of the present disclosure. In particular, the system and methods of the present disclosure configure the aggregated BIER networking devices 210*a* and 210*b* to operate as transit BFR devices (i.e., BIER networking devices that are not directly connected to a source device or receiver devices), despite the fact that the aggregated BIER networking devices 210*a* and 210*b* are configured as BFER devices (i.e., BIER networking devices that are directly connected to the receiver devices 216*a* and 216*b*.) As such, the aggregated BIER networking devices 210*a* and 210*b* will not be provided the BFR-IDs discussed above, and rather will only be provided the BFR prefixes discussed above. In an example, during the BIER networking system configuration operations discussed above, the aggregated BIER networking engine 304 in the aggregated BIER networking devices 210*a*/300 and 210*b*/300 may advertise their BFR prefixes in extended Type-Length-Value (TLV) data structures (e.g., BIER sub-TLV data structures) provided according to the underlay unicast routing protocol (e.g., the OSPF protocol, the IS-IS protocol, the BGP, etc.) that is being utilized with the BIER networking system 200.

Figure 6:
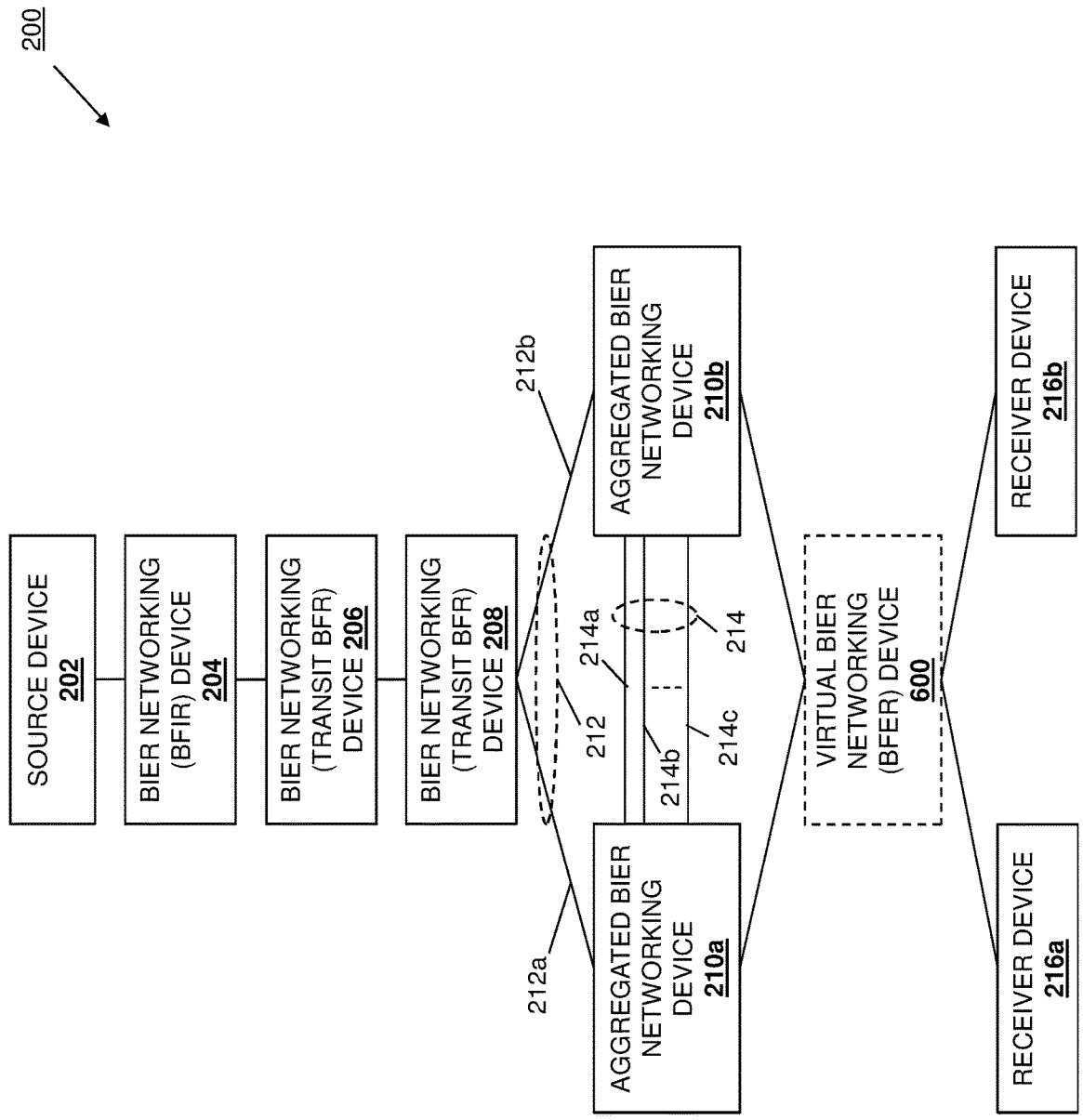
FIG. 6 is a schematic view illustrating an embodiment of the aggregated BIER networking system of FIG. 2 operating according to the method of FIG. 4.

The method 400 then proceeds to block 406 where the aggregated BFER devices advertise a virtual BFER device that appears to be located between the aggregated BFER devices and receiver devices. As will be appreciated by one of skill in the art in possession of the present disclosure, the transmission of the multicast communications requests received from the receiver devices 216*a* and 216*b* by the aggregated BIER networking devices 210*a* and 210*b* at block 402 may be performed as part of and/or at substantially the same time as the advertising of the virtual BFER device at block 406. With reference to FIG. 6, in an embodiment of block 402, the aggregated BIER networking engine 304 in the aggregated BIER networking devices 210*a*/300 and 210*b*/300 may advertise a virtual BIER networking device 600 that is configured as a virtual BFER device due to the virtual BIER networking device 600 appearing to be located between the aggregated BIER networking devices 210*a*/210*b* and the receiver devices 216*a*/216*b*. For example, FIG. 6 illustrates how the aggregated BIER networking engines 304 in the aggregated BIER networking devices 210*a*/300 and 210*b*/300 may operate to create the virtual BIER networking device 600 that is configured as a virtual BFER device due to the aggregated BIER networking engines 304 in the aggregated BIER networking devices 210*a*/300 and 210*b*/300 presenting the virtual BIER networking/BFER device 600 as being provided similarly to a Top of Rack (TOR) switch device that is located between the aggregated BIER networking devices 210*a*/210 and the receiver devices 216*a*/216*b*, and that connects the aggregated BIER networking devices 210*a*/210 to the receiver devices 216*a*/216*b*.

In other words, the virtual BIER networking device 600 created by the aggregated BIER networking devices 210*a*/300 and 210*b*/300 is provided in a manner such that it appears as a BFER device that is directly connected to the receiver devices 216*a* and 216*b*. For example, the virtual BFER device 600 may be provided a virtual BFR-ID, as well as a virtual BFR prefix that may be provided using an anycast Internet Protocol (IP) address (e.g., an anycast IP version 4 (IPv4) or anycast IP version 6 (IPv6) address). As will be appreciated by one of skill in the art in possession of the present disclosure, the anycast IP address provided for the virtual BFR prefix may be utilized by either of the aggregated BIER networking devices 210*a* and 210*b* while being assigned to the virtual BFER device 600. As such, at block 406, the aggregated BIER networking engines 304 in the aggregated BIER networking devices 210*a*/300 and 210*b*/300 may advertise the receiver devices 216*a* and 216*b* (which may have requested subscriptions to the multicast data packets generated by the source device 202 at block 402) as being directly connected to the virtual BFER device 600 having the virtual BFR-ID.

For example, at block 406, the aggregated BIER networking engines 304 in the aggregated BIER networking devices 210*a*/300 and 210*b*/300 may advertise a virtual BFER device tuple (e.g., {virtual BFR-ID, virtual BFR prefix}) in a manner that appears to other BIER networking devices as belonging to a virtual BFER device that is commonly reachable via each of the aggregated BIER networking devices 210*a* and 210*b*, as illustrated in FIG. 6, with the underlay routing protocol instances provided by the aggregated BIER networking engine s304 in the aggregated BIER networking devices 210*a*/300 and 210*b*/300 redistributing the virtual BFER device tuple. Furthermore, the aggregated BIER networking engines 304 in the aggregated BIER networking devices 210*a*/300 and 210*b*/300 may also program the virtual BFR-ID for the virtual BFER device 600 in their data plane forwarding tables (the BIFTs discussed above) in order to, for example, facilitate the termination and forwarding of BIER encapsulated data packets received with the virtual BFR-ID. While not discussed herein in detail, one of skill in the art in possession of the present disclosure will appreciate how, when the aggregated BIER networking devices 210*a* and 210*b* act as BFIR devices, those aggregated BIER networking devices 210*a* and 210*b* may utilize the virtual BFR-ID in the BIER header of a multicast data packet as well.

The BIER networking system configuration operations discussed above may include the generation of the following BIFT for the BFIR device 204 based on multicast communications requests by the receiver devices 216*a* and 216*b* at block 402:

| BFR ID | FORWARDING BIT MASK | BFR NEIGHBOR |
|---|---|---|
| 1 (0001) | 0001 | — |
| 2 (0010) | 0010 | TRANSIT BFR DEVICE 206 |

Similarly, the BIER networking system configuration operations discussed above may include the generation of the following BIFT for the transit BFR device 206 based on the multicast communications requests by the receiver devices 216a and 216b at block 402:

| BFR ID | FORWARDING BIT MASK | BFR NEIGHBOR |
| --- | --- | --- |
| 1 (0001) | 0001 | BFIR DEVICE 204 |
| 2 (0010) | 0010 | TRANSIT BFR DEVICE 208 |

Similarly, the BIER networking system configuration operations discussed above may include the generation of the following BIFT for the transit BFR device 208 based on the multicast communications requests by the receiver devices 216a and 216b at block 402:

| BFR ID | FORWARDING BIT MASK | BFR NEIGHBOR |
| --- | --- | --- |
| 1 (0001) | 0001 | TRANSIT BFR DEVICE 206 |
| 2 (0010) | 0010 | AGGREGATED BIER NETORKING DEVICE 210a |

Similarly, the BIER networking system configuration operations discussed above may include the generation of the following BIFT for the aggregated BIER networking device 210a based on the multicast communications requests by the receiver devices 216a and 216b at block 402:

| BFR ID | FORWARDING BIT MASK | BFR NEIGHBOR |
| --- | --- | --- |
| 1 (0001) | 0001 | TRANSIT BFR DEVICE 208 |
| 2 (0010) | 0010 | — |

Similarly, the BIER networking system configuration operations discussed above may include the generation of the following BIFT for the aggregated BIER networking device 210b based on the multicast communications requests by the receiver devices 216a and 216b at block 402:

| BFR ID | FORWARDING BIT MASK | BFR NEIGHBOR |
| --- | --- | --- |
| 1 (0001) | 0001 | TRANSIT BFR DEVICE 208 |
| 2 (0010) | 0010 | — |

As will be appreciated by one of skill in the art in possession of the present disclosure, in the example of the BIFTs provided above, the BFIR device 204 has been provided a BFR-ID of "1" (i.e., a bit string "0001"), and the virtual BFER device 600 has been provided a BFR-ID of "2" (i.e., a bit string "0010"). Furthermore, as discussed above, each of the BFIR device 204, the transit BFR devices 206 and 208, the aggregated BIER networking devices 210a and 210b, and the virtual BFER device 600 may be provided a respective BFR prefix as well.

With particular reference to the BIFT provided for the transit BFR device 208 above, one of skill in the art in possession of the present disclosure will appreciate that the aggregated BIER networking devices 210a and 210b form an "adjacency" (e.g., a VLT neighbor adjacency) with the transit BFR device 208, and based on the exchanged BFR-IDs and BFR prefixes, the BIFT tables may be generated for the forwarding of BIER encapsulated data packets. In particular, the transit BFR device 208 may utilize path selection protocols (e.g., the Equal Cost Multi-Path (ECMP) protocol) in order to decide which of the aggregated BIER networking devices 210a and 210b (which are presented to the transit BFR device 208 as transit BFR devices) to provide in its BIFT for forwarding multicast data packets via the virtual BFER device 600 (i.e., based on the virtual BFR-ID "2" provided for that virtual BFER device 600 in the example above). As such, while the BIFT for the transit BFR device 208 identifies the aggregated BIER networking device 210a for forwarding multicast data packets including the virtual BFR-ID "2" for the virtual VFR device 600 in the BIFT for the transit BFR device 208 above, one of skill in the art in possession of the present disclosure will appreciate that the aggregated BIER networking device 210b may alternatively be selected for forwarding multicast data packet identifying the virtual BFR-ID "2" for the virtual VFR device 600 in the BIFT for the transit BFR device 208 while remaining within the scope of the present disclosure as well.

Figure 7A:
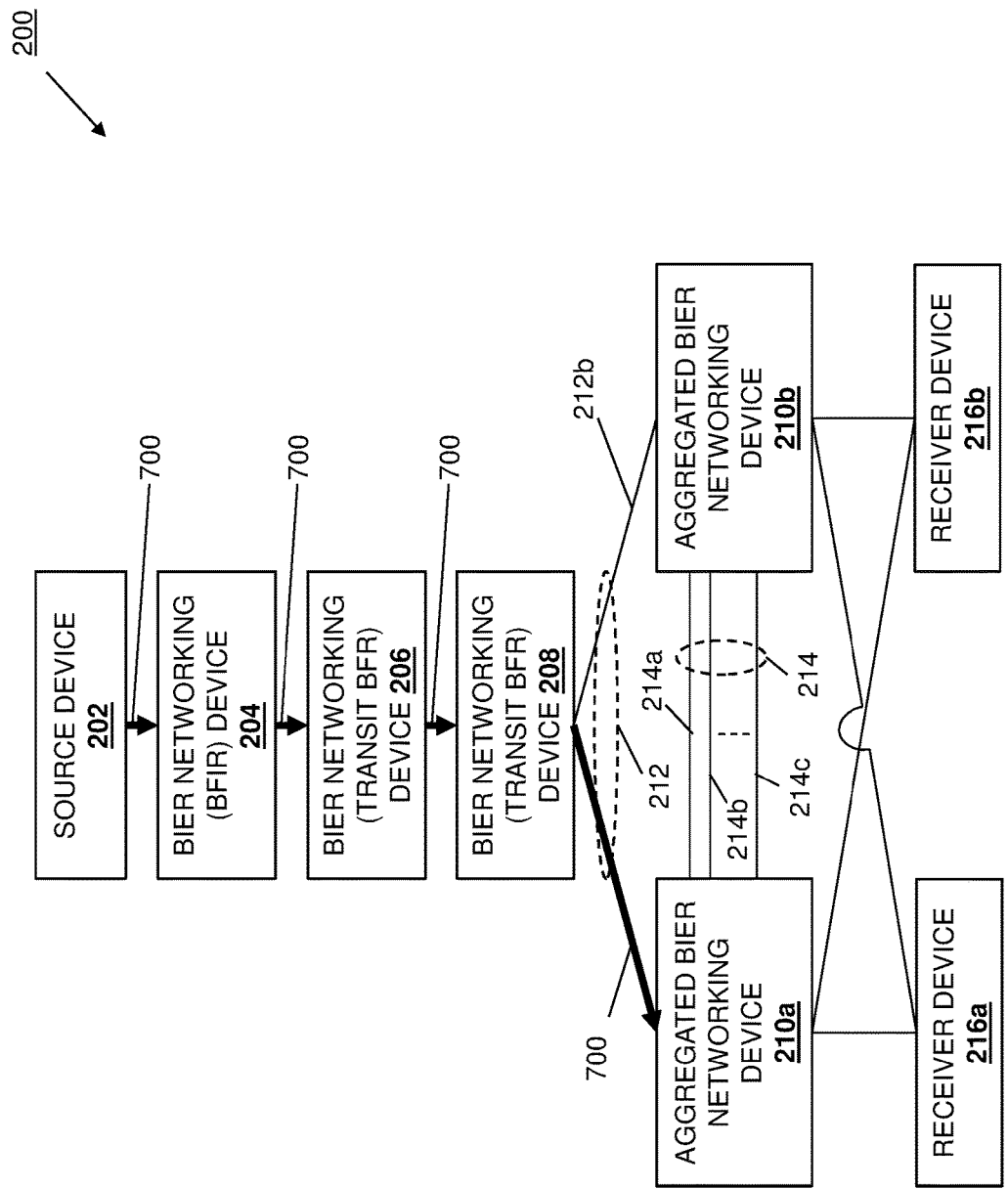
FIG. 7A is a schematic view illustrating an embodiment of the aggregated BIER networking system of FIG. 2 operating according to the method of FIG. 4.

The method 400 then proceeds to block 408 where a BFIR device receives multicast data packets from the source device and forwards the multicast data packets. With reference to FIG. 7A, in an embodiment of block 408 and subsequent to the BIER networking system configuration and multicast communication subscription discussed above, the source device 202 may generate and transmit a multicast data packet 700, which may be received by the BFIR device 700. In response to receiving the multicast data packet 700, the BFIR device 204 may utilize its BIFT (above) to forward the multicast data packet 700 to the transit BFR device 206 with a bit string of "0010". In response to receiving the multicast data packet 700, the transit BFR device 206 may utilize its BIFT (above) to forward the multicast data packet 700 to the transit BFR device 208 (i.e., based on the bit string "0010" in the forwarding bit mask of its BIFT.)

The method 400 then proceeds to block 410 where a transit BFR device that is directedly connected to the aggregated BFER devices receives the multicast data packet and forwards the multicast data packet to a first aggregated BFER device. With reference to FIG. 7A, in an embodiment of block 410 and in response to receiving the multicast data packet 700, the transit BFR device 208 may utilize its BIFT (above) to forward the multicast data packet 700 to the aggregated BIER networking device 210a (i.e., based on the bit string "0010" in the forwarding bit mask of its BIFT.) To contrast with the conventional aggregated BIER networking system operations discussed above with reference to FIG. 5D, the transit BRF device 208 does not forward the multicast data packet 700 to the aggregated BIER networking device 210b at block 410. Further, as discussed above, in other embodiments of block 410, the transit BRF device 208 may forward the multicast data packet 700 to the aggregated BIER networking device 210b and not the aggregated BIER networking device 210a at block 410.

Figure 7B:
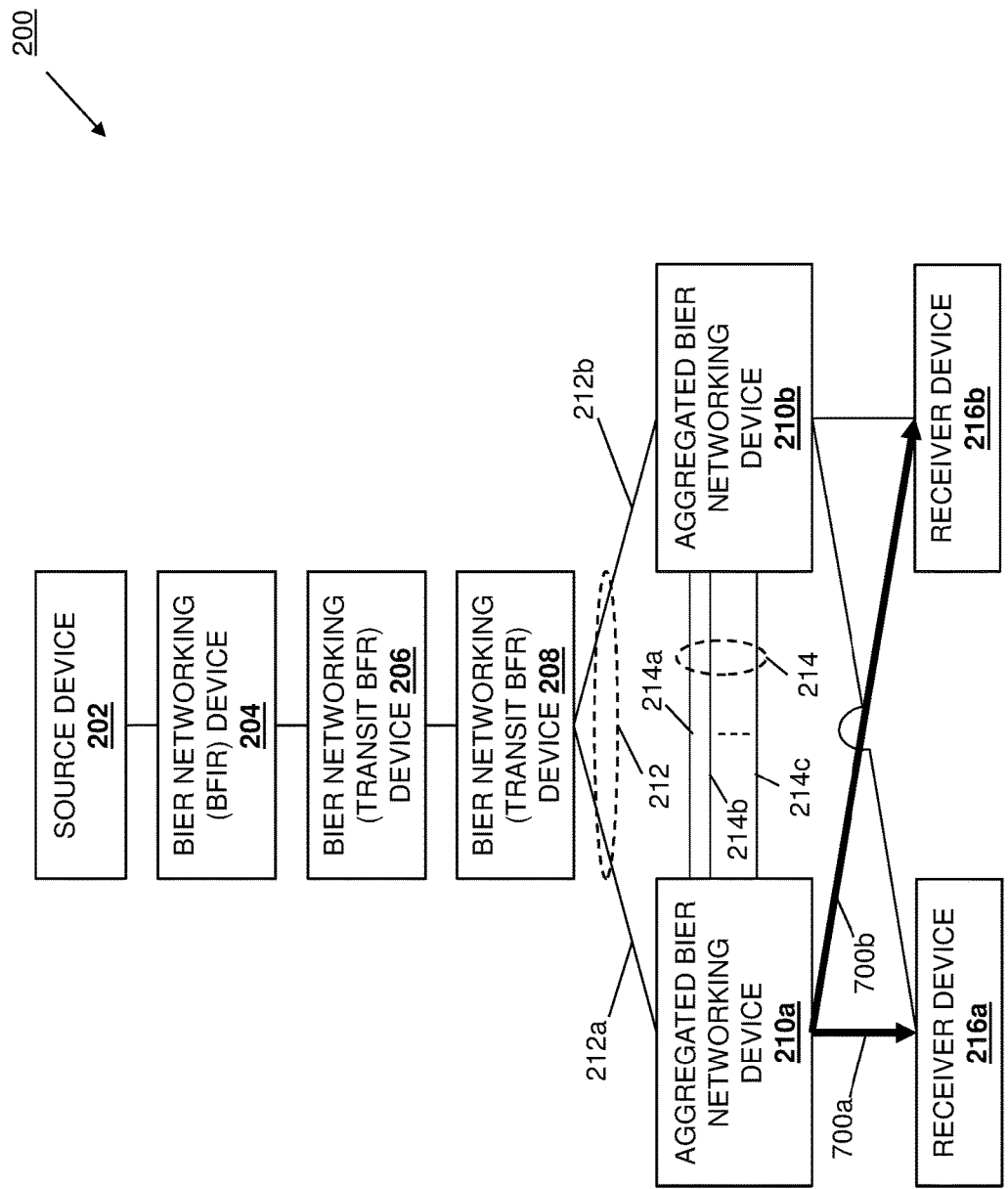
FIG. 7B is a schematic view illustrating an embodiment of the aggregated BIER networking system of FIG. 2 operating according to the method of FIG. 4.

The method 400 then proceeds to block 412 where the first aggregated BFER device receives the multicast data packet and forwards the multicast data packet to each receiver device. With reference to FIG. 7B, in an embodiment of block 412 and in response to receiving the multicast data packet 700, the aggregated BIER networking engine 304 in the aggregated BIER networking device 210a may perform aggregated networking device operations (e.g., VLT protocol operations) to create two copies 700a and 700b of the multicast data packet 700, forward the first copy 700a of the multicast data packet 700 to the receiver device 216a, and forward the second copy 700b of the multicast data packet 700 to the receiver device 216b (i.e., as a result of its exchange of the multicast communication receiver device subscriber information with the aggregated BIER networking device 210b that indicates both receivers devices 216a and 216b have subscribed to the multicast data packets from the source device 202.)

As such, the aggregated BIER networking system operations performed according to the method 400 will result in each of the receiver devices 216a and 216b receiving only a single copy of the multicast data packet 700. Thus, one of skill in the art in possession of the present disclosure will appreciate that the systems and methods described below provide for optimal resilient forwarding of multicast data packets in an aggregated BIER networking system (e.g., a BIER networking domain including VLT-enabled BFER devices) without the multicast data packet duplication at receiver devices that exists in conventional aggregated BIER networking systems, and in a manner that is compatible with any routing protocol deployed as the underlay for the BIER networking domain (e.g., the OSPF protocol, the IS-IS protocol, the BGP, etc.)

Thus, systems and methods have been described that provide VLT-enabled BIER networking devices that are configured as BFER devices that are directly connected to receiver devices, but that operate as transit BFR devices while providing a virtual BFER device that appears to be directly connected to each of the VLT-enabled BIER networking devices and each of the receiver devices. As such, the BIER networking device that is configured as a transit BFR device that is directly connected to the VLT-enabled BIER networking devices will provide multicast data packets generated by a source device to only one of the VLT-enabled BIER networking devices, which will then provide copies of those multicast data packets to each of the receiver devices, thus preventing the transmission of duplicate multicast data packets to the receiver devices as may occur in conventional BIER networking domains having VLT-enabled BFER devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An aggregated Bit Index Explicit Replication (BIER) networking system, comprising:
a first aggregated Bit Forwarding Egress Router (BFER) device that is aggregated with a second aggregated BFER device, wherein each of the first aggregated BFER device and the second aggregated BFER device are directly connected to a first receiver device and a second receiver device, and wherein the first aggregated BFER device is configured to:
receive, from the first receiver device, a request for multicast data packets generated by a source device and, in response, transmit the request;
receive, from the second aggregated BFER device, an identification of the second receiver device that has requested multicast data packets generated by the source device;
advertise a virtual BFER device that appears to be directly connected to each of the first aggregated BFER device, the second aggregated BFER device, the first receiver device, and the second receiver device;
receive a multicast data packet that identifies the virtual BFER device; and
forward the multicast data packet to each of the first receiver device and the second receiver device; and
a transit Bit Forwarding Router (BFR) device that is directed connected to each of the first aggregated BFER device and the second aggregated BFER device, wherein the transit BFR device is configured to:
select, based on the advertisement of the virtual BFER device, the first aggregated BFER device for forwarding multicast data packets to the virtual BFER device;
receive multicast data packets generated by the source device;
identify the virtual BFER device in the multicast data packets; and
forward the multicast data packets to the first aggregated BFER device.

2. The system of claim 1, further comprising:
a Bit Forwarding Ingress Router (BFIR) device that is directly connected to the source device and that is configured to:
receive multicast data packets generated by the source device; and
forward the multicast data packets to the transit BFR device.

3. The system of claim 1, wherein the first aggregated BFER device is configured to:
operate as a transit BFR device.

4. The system of claim 3, wherein the operating as a transit BFR device includes utilizing a BFR prefix without utilizing a BFR identifier.

5. The system of claim 1, wherein the virtual BFER device includes a virtual BFR identifier and a virtual BFR prefix.

6. The system of claim 5, wherein the virtual BFR prefix is provided by an anycast Internet Protocol (IP) address.

7. An Information Handling System (IHS), comprising:
a processing system; and
a memory system that is coupled to the processing system and that includes instructions that, when executed by the processing system, cause the processing system to provide an aggregated Bit Index Explicit Replication (BIER) networking engine that is configured to:
receive, from a first receiver device that is directly connected to each of a first aggregated BFER device and a second aggregated BFER device, a request for multicast data packets generated by a source device and, in response, transmit the request;
receive, from a second aggregated BFER device that is directly connected to each of the first aggregated BFER device and the second aggregated BFER device, an identification of a second receiver device that has requested multicast data packets generated by the source device;
advertise a virtual Bit Forwarding Egress Router (BFER) device that appears to be directly connected to each of a first aggregated BFER device, the second aggregated BFER device, the first receiver device, and the second receiver device;
receive a multicast data packet that identifies the virtual BFER device; and
forward the multicast data packet to each of the first receiver device and the second receiver device.

8. The IHS of claim 7, wherein the aggregated BIER networking engine is configured to:
operate as a transit Bit Forwarding Router (BFR) device.

9. The IHS of claim 8, wherein the operating as a transit BFR device includes utilizing a BFR prefix without utilizing a BFR identifier.

10. The IHS of claim 7, wherein the virtual BFER device includes a virtual BFR identifier and a virtual BFR prefix.

11. The IHS of claim 10, wherein the virtual BFR prefix is provided by an anycast Internet Protocol (IP) address.

12. The IHS of claim 10, wherein the advertising the virtual BFER device includes advertising the virtual BFR identifier and the virtual BFR prefix.

13. The IHS of claim 7, wherein the aggregated BIER networking engine is configured to:
generate a Bit Index Forwarding Table (BIFT); and
use the BIFT to forward the multicast data packet to each of the first receiver device and the second receiver device.

14. A method for providing for forwarding of multicast data packets in an aggregated Bit Index Explicit Replication (BIER) networking system, comprising:
receiving, by a first aggregated BFER device from a first receiver device that is directly connected to each of the first aggregated BFER device and a second aggregated BFER device, a request for multicast data packets generated by a source device and, in response, transmitting the request;
receiving, by the first aggregated BFER device from the second aggregated BFER device, an identification of a second receiver device that is directly connected to each of the first aggregated BFER device and a second aggregated BFER device and that has requested multicast data packets generated by the source device;
advertising, by the first aggregated BFER device, a virtual Bit Forwarding Egress Router (BFER) device that appears to be directly connected to each of a first aggregated BFER device, the second aggregated BFER device, the first receiver device, and the second receiver device;
receiving, by the first aggregated BFER device, a multicast data packet that identifies the virtual BFER device; and
forwarding, by the first aggregated BFER device, the multicast data packet to each of the first receiver device and the second receiver device.

15. The method of claim 14, further comprising:
operating, by the first aggregated BFER device, as a transit Bit Forwarding Router (BFR) device.

16. The method of claim 15, wherein the operating as a transit BFR device includes utilizing a BFR prefix without utilizing a BFR identifier.

17. The method of claim 14, wherein the virtual BFER device includes a virtual BFR identifier and a virtual BFR prefix.

18. The method of claim 17, wherein the virtual BFR prefix is provided by an anycast Internet Protocol (IP) address.

19. The method of claim 17, wherein the advertising the virtual BFER device includes advertising the virtual BFR identifier and the virtual BFR prefix.

20. The method of claim 14, further comprising:
generating, by the first aggregated BFER device, a Bit Index Forwarding Table (BIFT); and
using, by the first aggregated BFER device, the BIFT to forward the multicast data packet to each of the first receiver device and the second receiver device.

* * * * *